United States Patent [19]

Little

[11] Patent Number: 4,930,972
[45] Date of Patent: Jun. 5, 1990

[54] MATERIAL HANDLING VEHICLES

[76] Inventor: Robert Little, 1063 White Oak Drive, Burlington, Ontario, Canada

[21] Appl. No.: 405,384

[22] Filed: Sep. 8, 1989

[51] Int. Cl.$^5$ .............................................. B65F 3/02
[52] U.S. Cl. .................................. 414/549; 414/522; 414/728; 414/742
[58] Field of Search ............... 414/539, 546, 549, 551, 414/555, 569, 498, 500, 522, 501, 728, 742

[56] References Cited

U.S. PATENT DOCUMENTS

| | | | |
|---|---|---|---|
| 2,911,118 | 11/1959 | Tapp | 414/549 |
| 3,313,432 | 4/1967 | Sheldrew | 414/728 |
| 4,278,390 | 7/1981 | Ahearn | 414/728 X |
| 4,778,327 | 10/1988 | Tufenkian et al. | 414/549 X |

Primary Examiner—Frank E. Werner
Assistant Examiner—Keith L. Dixon
Attorney, Agent, or Firm—Rogers & Scott

[57] ABSTRACT

A new lugger truck employs a moveable load carrying platform in place of the standard fixed platform, the container being loaded on to the platform while it is in a rear position, which is then moved to a forward position, allowing the load carried by the truck to be positioned more forward of the rear axles, distributing the load proportionately between the front and rear axles to increase stability and load carrying capacity. The platform can be mounted on a standard truck chassis with a mimimum of modification and allows the use of a standard lugger mechanism with fixed-length arms, thereby decreasing cost and complexity and also permitting government regulations to be met with regard to maximum height of the truck. The platform is supported for its forward/rearward movement by longitudinal bearing surfaces mounted on both the platform and the truck chassis, the platform being moved by a hydraulic actuator. The pivots for the loading arms are disposed below the level of the platform to permit the use of standard length arms despite the increased height of the platform as compared to a standard truck.

8 Claims, 6 Drawing Sheets

MATERIAL HANDLING VEHICLES

FIELD OF THE INVENTION

The present invention concerned with improvements in or relating to material handling vehicles and especially, but not exclusively, to the type of such vehicles commonly known as lugger trucks which carry a drop-off container for the material to be handled.

REVIEW OF THE PRIOR ART

Lugger trucks are a specific type of material handling vehicle that are equipped with a loading/unloading mehanism for the drop-off container comprising two transversely-spaced, parallel lifting arms, which are pivotally mounted on the vehicle for movement in a longitudinal forward/rearward direction about a horizontal axis located adjacent the rear end of the vehicle. To load a container the lugger truck is backed close up against one end thereof and the lifting arms are pivoted backwards until they extend over the container, when a set of lifting slings carried by the arms can be attached to projections at the sides of the container. The arms are then pivoted forward to simultaneously lift the container and move it onto the body of the vehicle.

The system is simple and easy to use and it has been widely adopted. For the sake of cost reduction it is preferred to use a standard vehicle chassis of standard height (i.e. rather than a special more expensive lowbed chassis as is employed for high loads), while at the same time the whole vehicle with the maximum size container in place must meet the usual transport gauge requirements for public road use, particularly the maximum height requirement for it to pass under bridges.

The maximum load that can be carried is determined principally by the axle load permitted in the jurisdiction in which the vehicle operates, and authorities have become much more strict in this regard in view of the road damage that can be caused by overloading. It is therefore clearly of advantage to distribute the load between the front and rear axles to the maximum of their respective capacites, or proportionally to the maximum, but it becomes difficult to do this with a standard truck chassis because of the geometrical constraints in designing a suitable arm system. Thus, the arms are fixed in length and must be short enough to meet to maximum height requirements, yet must be able to lift the fully-loaded container high enough to clear the back end of the vehicle, and also deposit it as far forward as possible, while at the same time maintaining the longitudinal stability of the vehicle during loading and unloading; in practice this is difficult to do. This preferred distribution of the load proportionally between the axles, rather than the rear axles being relatively heavily loaded while the front axle (or axles) is relatively lightly loaded, would also be advantageous in improving the road handling of the fully-loaded vehicle.

Attempts have therefore been made hitherto to provide lugger trucks with loading/unloading mechanisms which can slide the container (or containers) in a forward/rearward direction after its loading on the vehicle platform in order to accomodate a number of smaller containers on the platform one behind the other, or to change the load distribution. These proposals do not however appear to have found widespread acceptance, mainly it is believed because of the cost and complexity of the mechanism required to allow the lifting arms to move in unison down either side of the platform, while supporting a loaded container, and/or the problem of mounting such mechanisms on a vehicle chassis of standard height while meeting maximum height requirements.

DEFINITION OF THE INVENTION

It is an object of the present invention therefore to provide a new material handling vehicle with which the load distribution between the front and rear axles can be adjusted in a manner that permits an increase in load carrying capacity.

It is another object to provide a movable load carrying platform for a lugger truck which allows the load carried by the lugger truck to be moved forward on the truck after loading thereon to increase load carrying capacity and stability.

It is a further object to provide such a platform that can be mounted on a standard truck chassis with a minimum of modification and allow the use of a standard lugger fixed length arm lifting mechanism, therby minimizing cost and complexity.

In accordance with the present invention there is provided a load-carrying platform for use with a lugger truck having front and rear running wheels and a truck chassis, comprising:

a platform member having front and rear ends and providing a platform surface on which a drop-off container can be deposited;

the platform member comprising a pair of container lifting arms mounted adjacent the rear end of the platform member about a horizontal pivot axis for movement betwen a rear position in which a container on the ground is engaged and disengaged, and a forward position in which a container is disposed on the platform surface, and motor means connected between the platform member and the lifting arms for moving the arms in said movement;

the platform member also comprising bearing means on its underside for engagement with cooperating bearing means on the truck chassis to permit forward/rearward movement of the platform member on the truck chassis, retaining means operable between the platform and the truck chassis to maintain the platform in engagement with the truck chassis during said forward-/rearward movement, and motor means for connection between the platform member and the truck chassis for moving the platform member on the truck chassis in such movement;

whereby the platform member is movable to a rear position in which a drop-off container is loaded onto and unloaded from the platform member, and to a forward position with a drop-off container loaded thereon to distribute the load of the container more evenly between the truck front and rear running wheels.

DESCRIPTION OF THE DRAWINGS

A particular preferred embodiment of the invention will now be described, by way of example, with reference to the accompanying diagrammatic drawings, wherein.

DESCRIPTION OF THE PREFERRED EMBODIMENTS

Figure 1:
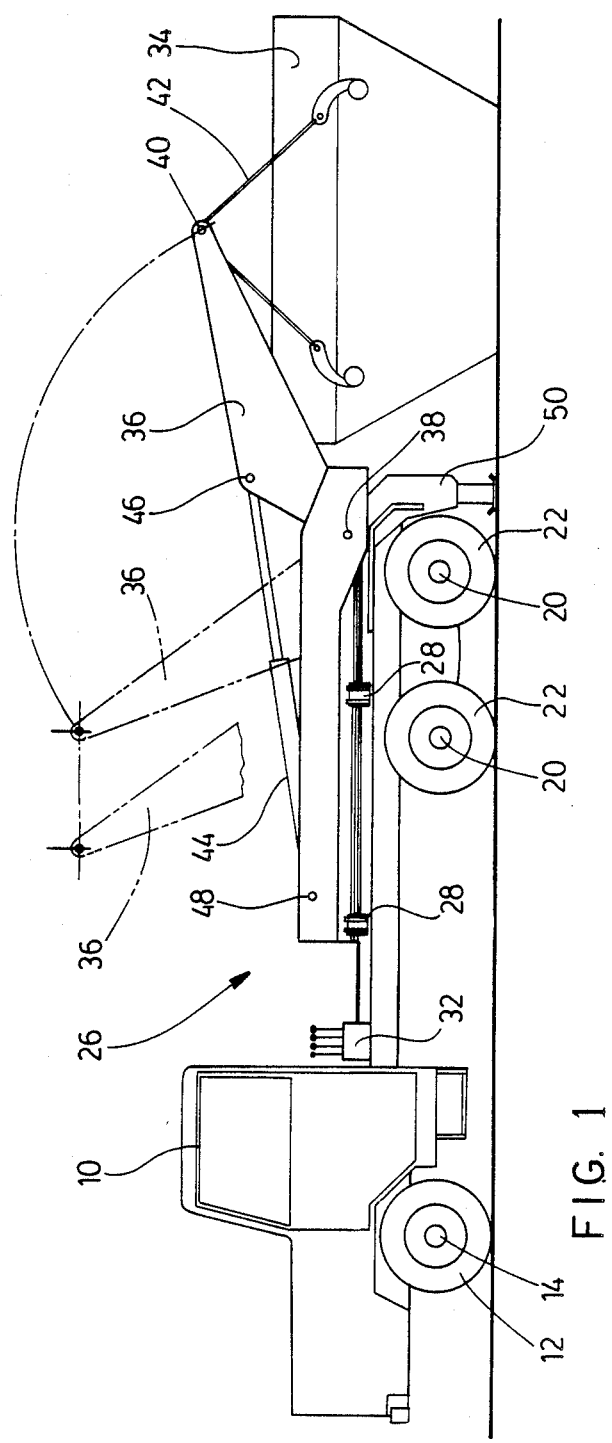
FIG. 1 is a side elevation of a lugger truck embodying the invention showing the moveable platform thereof in its rear loading and unloading position and a container on the ground ready for loading.

In this preferred embodiment the invention is shown employed with a standard single front-steering axle truck chassis of about 29,000 Kg. (64,000 pounds) gross weight capacity consisting of an operator's cab 10, a pair of front steerable wheels 12 mounted on a front steering axle 14, a longitudinal chassis frame 16 having thereon two transversely spaced parallel chassis members 18, and two longitudinally spaced rear axles 20. The two rear axles each carry four wheels in two pairs for maximum load-carrying capacity. It is also desired to load the front steering axle 14 to its maximum capacity and relatively high load capacity steering axles of about 9,000 Kg. (20,000 pounds) are now available, so that it is possible to distribute the load with 9,000 Kg. (20,000 pounds) carried by the front axle and the remaining 20,000 Kg. (44,000 pounds) carried by the rear axles. Steering axles are usually intended to be used with single wheels 12 and if greater front end load carrying capacity is required this can be obtained in known manner by using two coupled steering axles in tandem (not shown), whereupon the gross weight capacity is increased by the extra 9,000 Kg (20,000 pounds) to about 38,000 Kg (84,000 pounds). Another way in which the gross weight capacity is sometimes increased is by use of what is known as an "airlift" axle, with or without castering mountings, between the front and rear axles, the wheels on this axle being lifted from the road by the driver when a tight turn is to be made.

Figure 2:
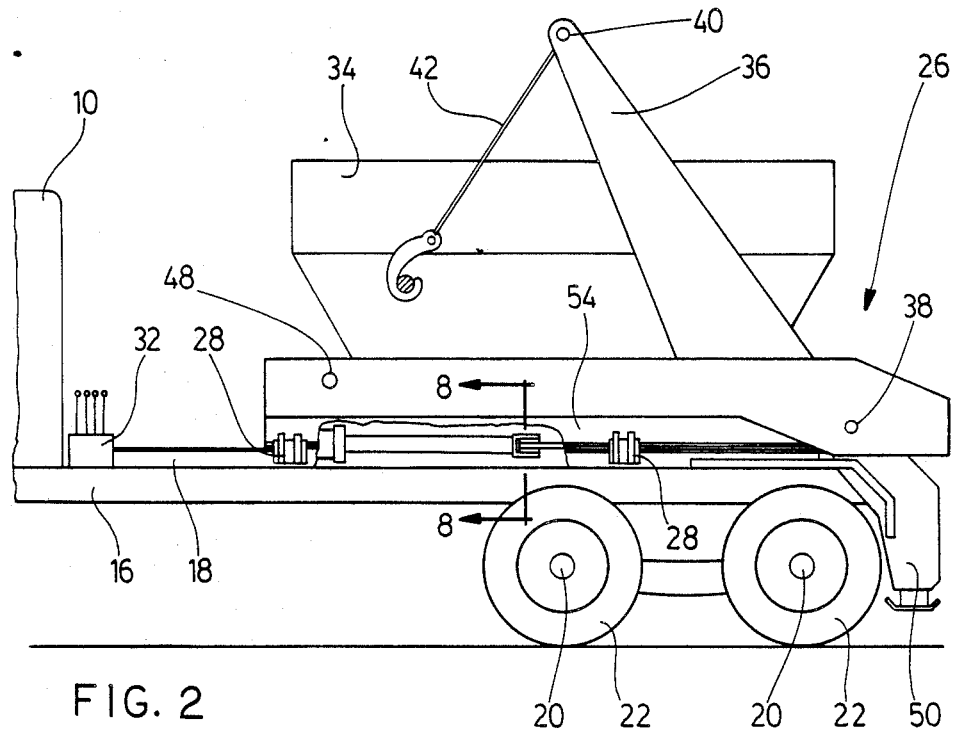
FIG. 2 is a similar view of the rear end only of the lugger truck with the moveable platform still in its rear loading and unloading position and the container loaded theron, part of the platform being broken away for clarity of illustration of the platform moving mechanism.
Figure 3:
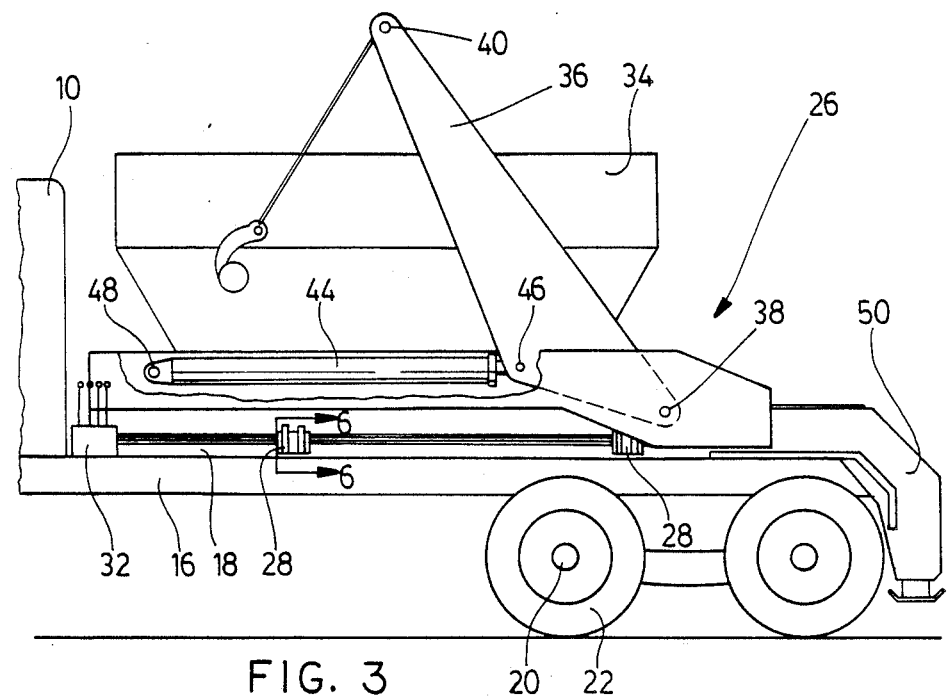
FIG. 3 is a view similar to FIG. 2 showing the platform in its forward travelling position, part being broken away to show the arm moving mechanism.
Figure 4:
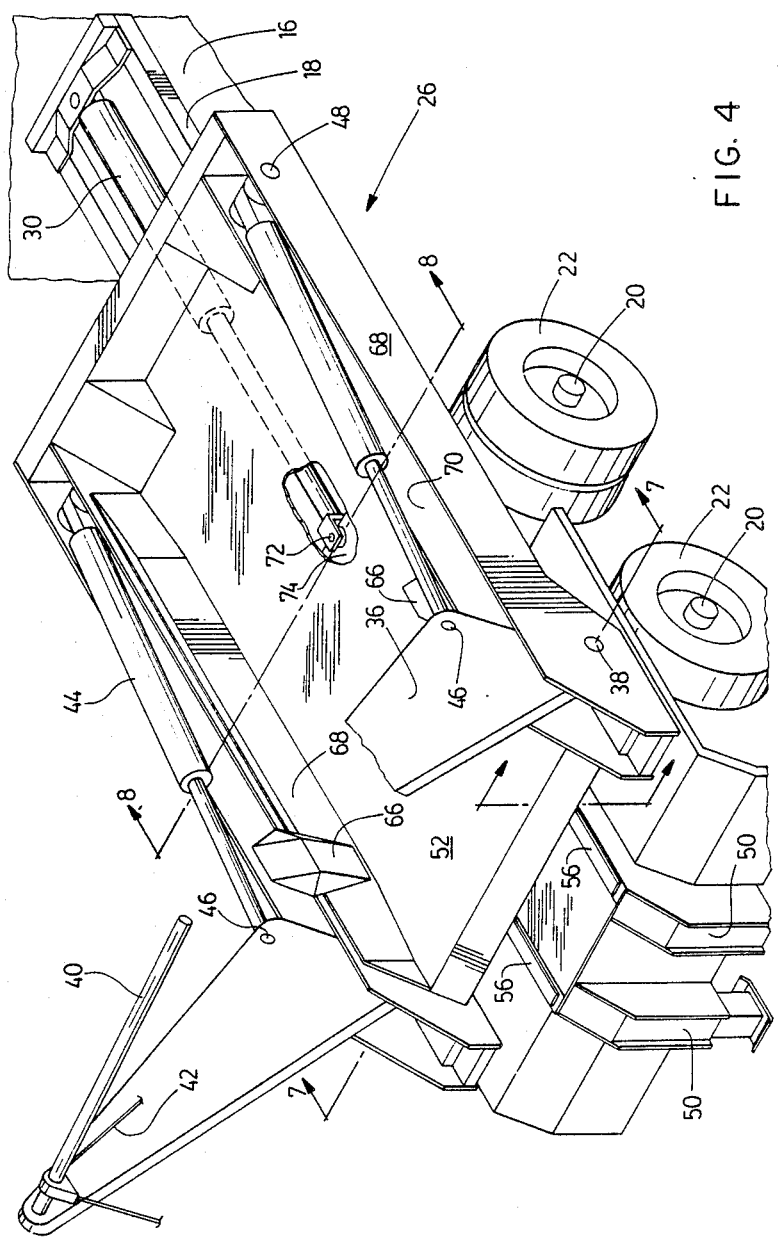
FIG. 4 is a perspective view from the rear and above to show the structure of the moveable platform, part of the floor being broken away for this purpose.

The truck chassis supports a moveable load carrying platform, indicated generally by the reference 26, for longitudinal forward/rearward sliding movement between a rear loading/unloading position shown in FIGS. 1 and 2 and a front travelling position shown in FIG. 3, the platform being retained transversely and guided for such movement by longitudinally spaced side retainers 28 attached to the sides of the members 18. It is moved as required by a hydraulic piston and cylinder motor 30, the motor being controlled by operation of the appropriate valves at a control section 32 just behind the cab 10. The platform carries a loading/unloading structure of known type for a container 34, this structure consisting of a pair of fixed-length, transversely-spaced parallel lifting arms 36 pivoted about respective horizontal coaxial pivot shafts 38, and connected at their top ends for simultaneous movement by a transverse connecting rod 40, from which extends a pair of slings 42 terminating in hooks that engage lifting bosses on the container sides. The arms are moved as required between a rear loading/unloading position shown in solid lines in FIG. 1, and a front loaded or travelling position shown in broken lines in that Figure by two piston and cylinder motors 44 mounted on the platform, the motors being pivotally connected at 46 to the arms and at 48 to the platform, and also being controlled by respective valves at the control station 32. The rear end of the chassis 16 is provided with a pair of transversely spaced hydraulically operated stabilizers 50 which are extended to engage the ground while the container is loaded and unloaded, as shown in FIG. 1, their operation also being controlled from the station 32.

In operation therefore, to pick up a fully loaded container, the platform is moved to its rearward position and the truck backed into position against the end of the container. The rear stabilizers 50 are extended, the arms 36 swung to the rear and the sling hooks engaged. The container 34 is now lifted into position on the platform, which is then moved by its motor 30 to its forward position for running while the stabilizers are raised. The sequence is reversed for unloading.

It will be noted that with the platform in its rear postion shown in FIGS. 1 and 2 more of its weight is over the rear wheels 22 than when it is in its forward position shown in FIG. 3, and by careful choice of the amount of longitudinal movement of the platform it can be arranged that in the forward position the weight is distributed between the wheels propertionally in accordance with their maximum designed load capacity, increasing the maximum capacity available and also improving the running road stability. Moreover, it is possible to obtain this improved result using arms 36 of sufficiently short length to be able without difficulty to meet government regulations as to maximum height; while giving the effective "throw" of much longer arms that would not meet these regulations.

We have found that by application of the invention it is possible to increase the maximum load-carrying capacity of a lugger truck built on a standard truck chassis of 4.93 meters (194 ins) wheelbase from 21,636 Kg (47,700 lbs) gross, distributed 18,212 Kg (40,150 lbs) on the rear wheels and 3,425 Kg (7,750 lbs) on the front wheels to about 26,988 Kg (59,500 lbs) distributed with the same amount on the rear wheels and the balance on the front wheels, this distribution requiring the load platform to be moved forward about 107 cm (42 ins). In this case a high capacity front steering axle is employed to withstand the additional load, which would not have been used in the prior art structures since such loadings could not be obtained. As described above, if tandem front steering axles or an intermediate airlift axle, are employed the gross capacity can be raised even further.

Figure 6:
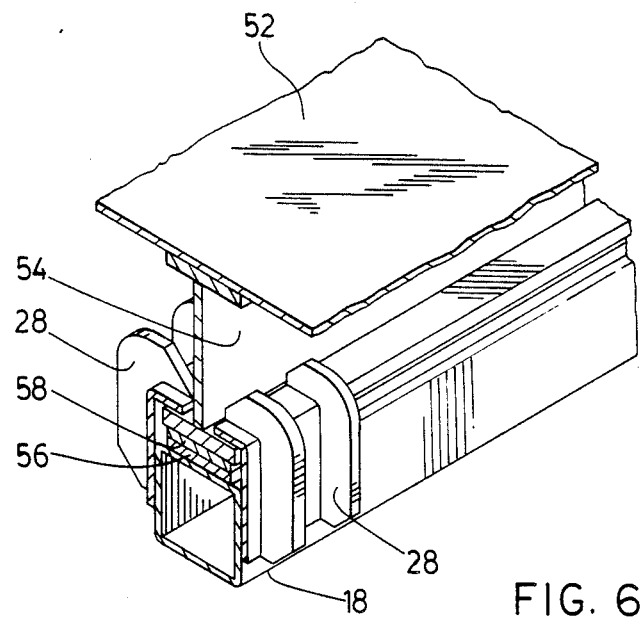
FIG. 6 is a perspective view of a detail of the manner in which the platform is mounted for movement on the truck chassis members, the view being taken generally on the line 6—6 in FIG. 3.
Figure 7:
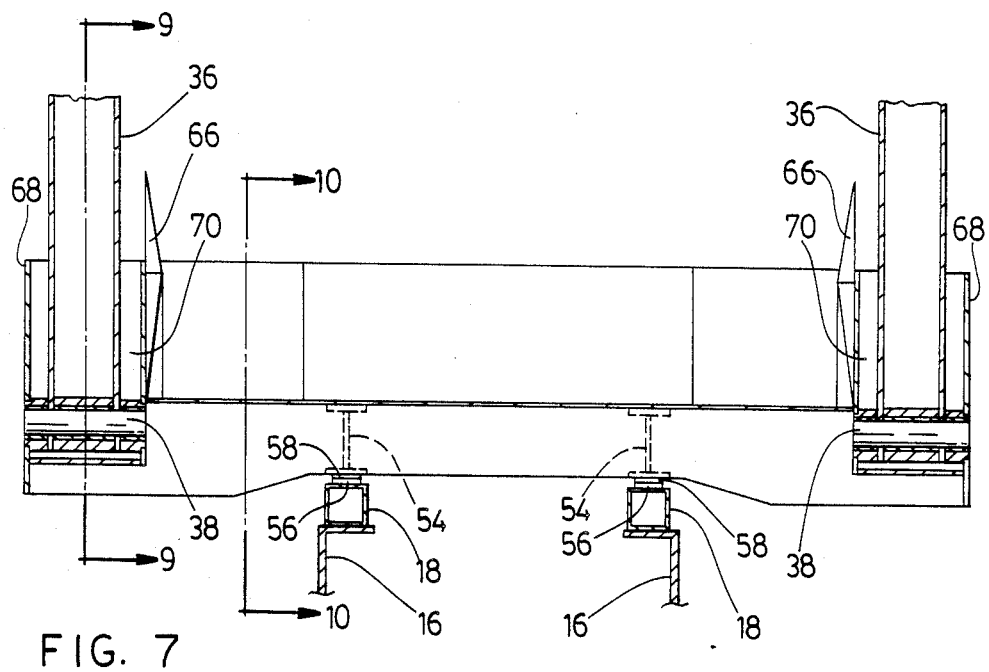
FIG. 7 is a plane cross-section taken on the line 7—7 in FIG. 4.

The platform 26 consists of a flat heavy metal base plate 52 upon which the container 34 is deposited. The plate has two vertically-downwardly extending I cross-section members 54 attached to its underside so that the lower flange sits on the horizontal upper surface of a respective chassis member 18, constituting bearing means permitting the platform to move freely longitudinally on the chassis while retained transversely by the members 28 (FIG. 6), which extend upwards and embrace the edges of the cross-bar. A replaceable metal wear strip 56 and a strip 58 of low-friction material, such as a nylon, are interposed between each member 18 and the lower flange. Additionally a suitable lubricant grease can be applied between the moving surfaces. The underneath of the palte 52 is provided on either side and immediately adjacent to the load-bearing pivots 38 with heavy (e.g. 5 cm thick) transverse reinforcing bars 62. The rear end of the plate is provided with an upwardly-shaped protion 64 to guide the container on to the platform, and the sides of the platform are provided with guide members 66 to centralize the container on the platform.

Figure 5:
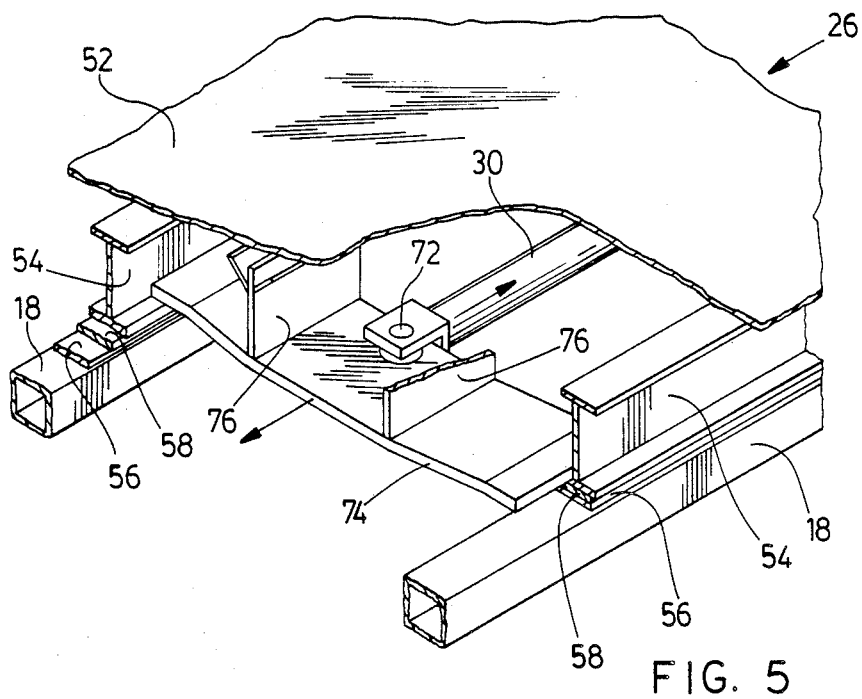
FIG. 5 is perspective view of a detail of the connection between the platform and the means for moving it.
Figure 8:
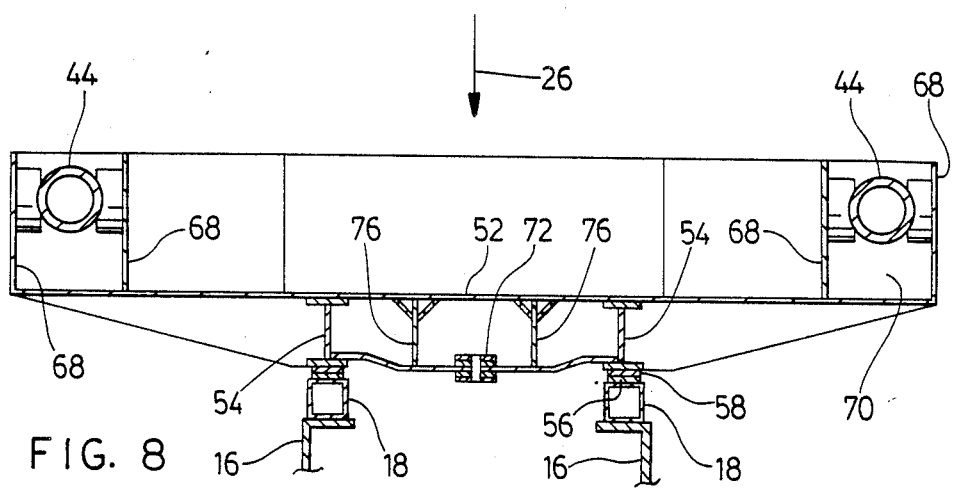
FIG. 8 is a plane cross-section taken on the line 8—8 in FIG. 2 and in FIG. 4.
Figure 9:
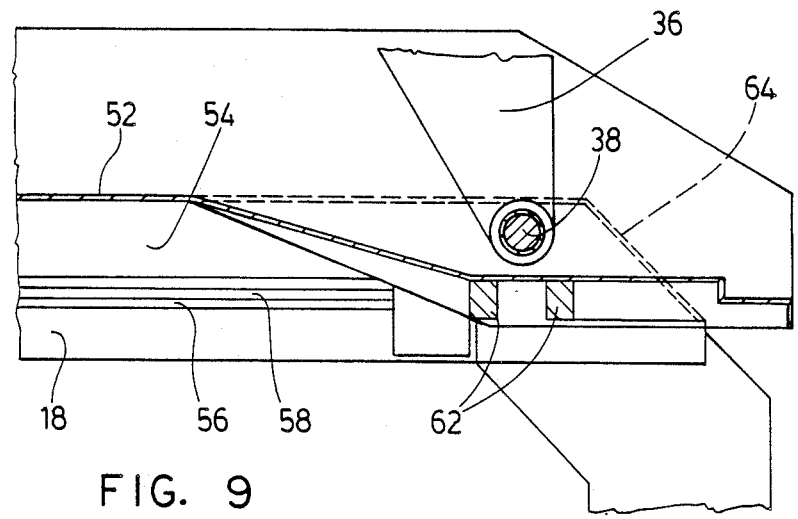
FIG. 9 is a plane cross-section taken on the line 9—9 in FIG. 7.
Figure 10:
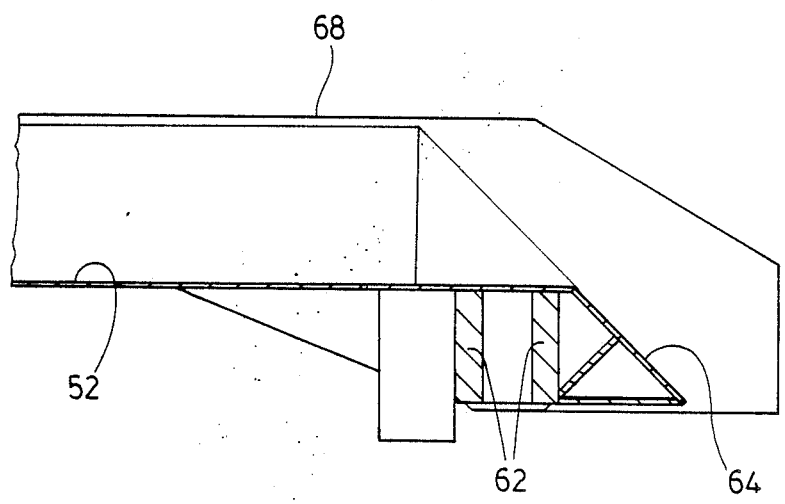
FIG. 10 is a plne cross-section taken on the line 10—10 in FIG. 7.

The arm members 36 and their operating motors 44 are mounted on the platform by means of respective pairs of closely transversely-spaced parallel vertical plates 68 forming respective narrow troughs 70 at each side of the platform. Each trough therefore provides a separate force receiving and resisting structure separate also from the platform, so that its height on the truck chassis can be made lower than that of the platform so as to maximize the length of arm that can be used. At their rear ends these plates are shaped to extend beneath the level of the plate 52, so that the coaxial axes of the pivot shafts 38 are beneath the plate to again provide for the maximum length of the arms 36 within the permitted height gauge. The motor 30 and its attachments to the chassis and the platform are subjected to the heavy sliding load of the platform and a fully loaded container and accordingly the attachment of the motor piston at 72 (FIGS. 5 and 8) is to a special cross-member 74 attached to the I-members 54, and also provided with additional vertical connection members 76.

In the embodiment described above the bearing means between the platform and the chassis employ sliding bearing surfaces to permit the necessary forward/rearward movement, but in other embodiments other bearing means may be employed, such as two transversely-spaced sets of longitudinally-spaced rollers, preferably mounted on the underside of the platform.

It will be seen therefore that the invention provides a new lugger truck having important structural, operational nd economic advantages over the trucks currently in use, in permitting maximum use of the load carrying capacity of the truck axle employed, while employing standard components, meeting government regulations with regard to maximum dimensions, and also improved riding characteristics because of the better load distribution.

I claim:

1. A load-carrying platform for use with a lugger truck having front and rear running wheels and a truck chassis, comprising:

a platform member having front and rear ends and providing a platform surface on which a drop-off container can be deposited;

the platform member comprising a pair of container lifting arms mounted adjacent the rear end of the platform member about a horizontal pivot axis for movement between a rear position in which a container on the ground is engaged and disengagesd, and a forward position in which a container is disposed on the platform surface, and motor means connected between the platform member and the lifting arms for moving the arms in said movement;

the platform member also comprising bearing means on its underside for engagement with cooperating bearing means on the truck chassis to permit forward/rearward movement of the platform member on the truck chassis, retaining means operable between the platform and the truck chassis to maintain the platform in engagement with the truck chassis during said forward/rearward movement, and motor means for connection between the platform member and the truck chassis for moving the platform member on the truck chassis in said movement;

whereby the platform member is movable to a rear position in which a drop-off container is loaded onto and unloaded from the platform member, and to a forward position with a drop-off container loaded thereon to distribute the load of the container more evenly between the truck front and rear running wheels.

2. The invention as claimed in claim 1, wherein the lifting arms are of fixed length.

3. The invention as claimed in claim 1, wherein the lifting arms are mounted in respective trough portions on either side of the platform member, the rear end of each trough portion receiving a pivot for the respective arm disposed with its axis below the platform surface of the platform member.

4. The invention as claimed in claim 3, wherein the lifting arms are of fixed length.

5. The invention as claimed in claim 1, wherein the bearing means are sliding bearing means and comprise two transversely-spaced platform members having respective horizontal surfaces resting on respective horizontal surfaces of longitudinal truck chassis members and retained thereon against sideways movement.

6. The invention as claimed in claim 5, wherein a longitudinal strip of low friction material is interposed between the horizontal surfaces of the sliding bearing means.

7. The invention as claimed in claim 5, wherein the sliding bearing means are retained against sideways movement by retainer members on the truck chassis embracing the platform members.

8. The invention as claimed in claim 1, in combination with vertically extendible stabilizer members at the rear end of the truck chassis and operable to engage the ground and stabilize the chassis during loading and unloading of a container.

* * * * *